3,159,495
PROCESS FOR THE STERILIZATION OF FLOUR
Cornelis H. Japikse, Springfield Township, Hamilton County, Ohio, assignor to The Procter & Gamble Company, Cincinnati, Ohio, a corporation of Ohio
Filed Dec. 31, 1962, Ser. No. 248,621
10 Claims. (Cl. 99—232)

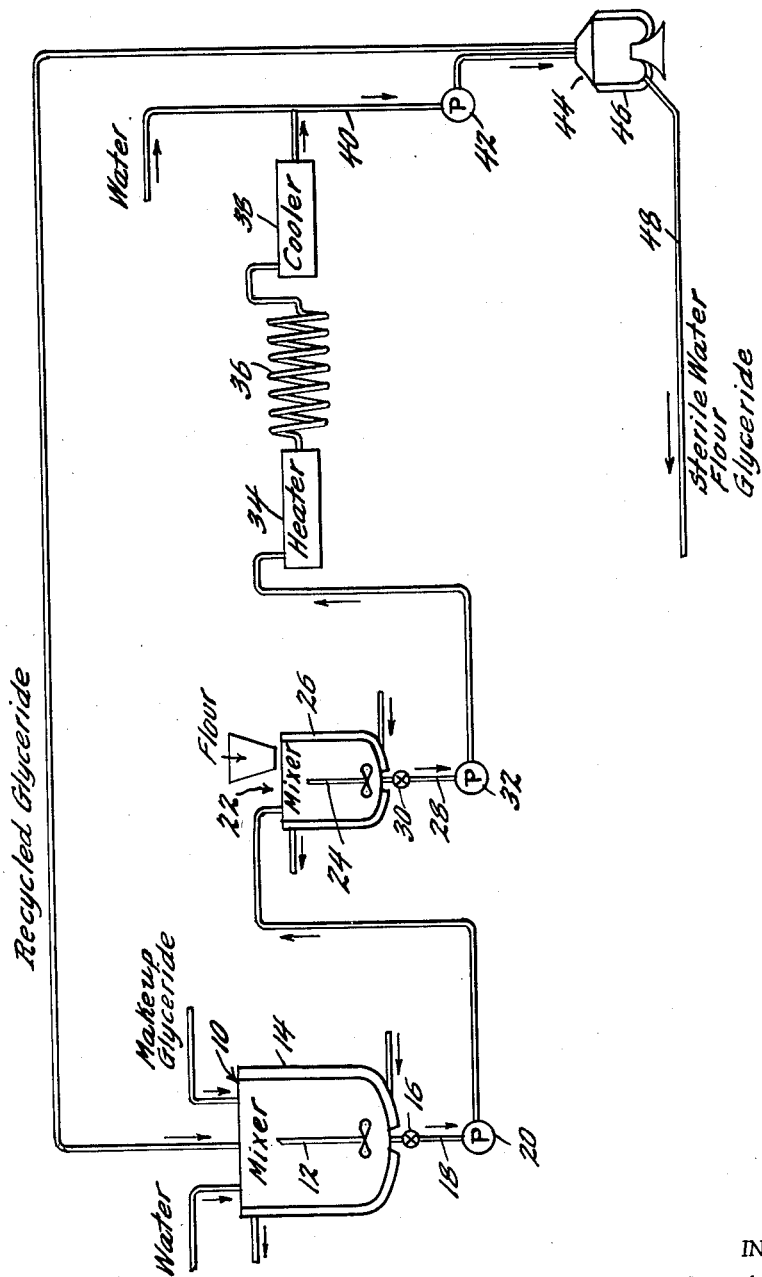

This invention relates to the sterilization of flour and is concerned, more particularly, with a process for sterilizing flour wherein glyceridic materal serves as a carrier for the flour.

There is disclosed in the application of Japikse and Lawrence, Serial Number 248,619, entitled "Method of Sterilizing Flour With Minimum Physicochemical Changes" filed concurrently herewith, a procedure for achieving at least substantially complete devitalization of all microorganisms in flour or the like by means of treatment in a steam-containing atmosphere under a combination of conditions carefully selected so as to destroy the microorganisms with the minimum possible detriment to the functionality of the flour for normal baking purposes. While this process is quite satisfactory from the standpoint of elimination of microbiological contamination, some degradation of the active principles of the flour involved in baking was found to be an inevitable consequence. Thus, a modification of the process was devised wherein the flour was subjected to a combination of somewhat less rigorous treatment conditions which was found to be effective in at least substantially eliminating non-sporeforming microorganisms while preserving the functionality of the flour to a considerably greater extent, the growth of any surviving organisms of the sporeforming type being inhibited in any later use of the treated flour by means of refrigeration or other available techniques. The latter concept forms the subject matter of the application of Lawrence and Liepa, Serial Number 248,620, entitled "Process for Treating Flour to reduce Microbiological Contamination," also filed concurrently herewith. The processes of both of these applications contemplate the use of a steam-containing gaseous atmosphere, and rather careful selection of treatment conditions is necessary in either case in order to achieve optimum microbiological decontamination with minimum reduction in the functional characteristics of the flour. The choice of the steam-containing treatment atmosphere is dictated by the requirements, on the one hand, that some moisture be present for adequate destruction of microbiological life, and on the other hand, that liquid water be excluded from contact with the flour on account of the tendency of the starch component of the flour to undergo gelatinization in the presence of liquid water at temperatures consistent with microbiological destruction. Such an atmosphere is unquestionably effective as a heat transfer medium in the sterilization of flour but its maintenance involves some practical problems which some processors may prefer to avoid.

The present invention is based upon the discovery that the sterilization of flour can be successfully practiced with a considerably greater tolerance in treatment conditions than is possible in the processes already referred to by use of a fluid glyceridic material as a heat transfer medium for the flour, provided a limited amount of liquid water is uniformly distributed throughout the glyceridic material. This discovery is entirely unexpected for several reasons. First, those in the art concerned in the past with the sterilization of materials in aqueous systems in general have considered the addition of a fatty or oleaginous substance to such systems to be highly disadvantageous to the attainment of effective sterilization. Second, neither a glyceridic material nor liquid water alone constitutes a satisfactory medium for sterilizing flour. Thus, when an effort is made to sterilize flour suspended in a glyceridic material such as a fat alone, the temperatures found necessary to destroy microbial life are so high that severe degradation of the functional properties of the flour for baking purposes results, as evidenced in many instances by actual charring of the flour. On the other hand, when flour is heated in an aqueous medium, it undergoes gelatinization long before a temperature needed to effect sterilization can be reached and is rendered useless for ordinary culinary purposes. The reasons why these media which are ineffective by themselves perform satisfactorily when employed in conjunction in accordance with the invention cannot be fully explained. It is believed that the glyceridic material serves as a distribution vehicle for the water, making it possible for the flour to be brought into intimate contact with an amount of water sufficient for good sterilization action but insufficient for gelatinization. Whatever the correct explanation may be, however, a suspension of water and a glyceridic material has proved an efficient medium for the sterilization of flour.

The product of the treatment of the invention comprises a mixture of flour, fat and moisture, the proportions of which can be adjusted to vary the consistency of the product from a heavy comminuted solid to a pumpable slurry, and is especially well adapted for use in a wide variety of culinary goods conventionally formulated from fat and flour, such as mixes and batters for cakes, cookies, cream puffs and the like, gravy mixes, pie doughs and so on. By mixing the sterile flour-fat mixture with other sterile ingredients as may be necessary to their formulation, these goods can be manufactured with high-moisture content and sold in sealed packages to be kept under refrigeration, or even at room temperature in many instances, with no serious risk of microbiological growth while in distribution channels.

In accordance with the present invention, flour is suspended in a fluid glyceridic material, containing a predetermined amount of liquid water dispersed therein, in a ratio by weight of 1:2–3:1 of flour to fat, the blend thus produced being heated at a temperature and for a time sufficient to destroy microbial life to the desired extent and then cooled to a temperature at least below the degradation temperature of starch. If the amount of flour does not exceed about twice the amount of fat, there can be obtained a pumpable mixture adapted for continuous processing, from which excess fat can be removed, if desired, by breaking the dispersion and centrifuging, leaving a pumpable slurry of flour in water containing a minor amount of fat.

As employed herein, the term "flour" is intended to embrace farinaceous materials comprised by protein and starch generally. Thus, the term includes but is not limited to, flours and/or meals derived from wheat, corn, and other cereal grains such as rye and barley, as well as from certain legumes such as soy beans, peanuts and the like. As is well known, the starch component of such materials undergoes degradation, such as gelatinization, at a temperature in the vicinity of 130–140° F. For convenience, the term "starch degradation temperature" is used herein to denote this temperature. Where the term "glyceridic material" appears, it is to be understood as being generally synonymous with "fatty material."

The glyceridic material suitable for the present invention may be any of the natural or artificially produced fatty or oleaginous materials commonly employed in the production of culinary shortenings. Under most circumstances, the glyceridic material will consist at least in part of a triglyceride. Pure triglycerides, such as triolein and tristearin, are quite satisfactory, but natural higher fatty acid triglycerides will usually be more readily available, such as the natural animal and vegetable fats and oils including cottonseed oil, sunflower seed oil, linseed oil, hazelnut oil, soybean oil, peanut oil, olive oil, corn oil, palm oil, lard, tallow and mixtures thereof, among others. Commercially available shortenings, either emulsified or not, can be used instead of natural fat if more convenient. The naturally unsaturated oils can be converted to saturated form by hydrogenation, if desired, or can be used in their original state. As will be explained shortly, replacement of a minor proportion of the triglyceride with a partial glyceride, such as the mono- and diglycerides of a higher fatty acid or a mixture of such acids, is quite advantageous. In fact, the glyceridic material may be composed entirely of partial glycerides if cost is not important. It is immaterial whether the glyceridic material be normally liquid or solid. If solid, it is heated to at least liquifaction temperature prior to use in the present process, and the term "fluid" as used in this connection is to be understood as embracing glyceridic materials that are either naturally liquid or have been rendered so by heating, special compounding or other ways.

The amount of liquid water that is incorporated into the fat has been found to be an important factor in the practice of the invention. The minimum amount of water is that necessary to provide a sufficient quantity of free water, i.e., in excess of any water absorbed by the glyceridic material, to result in the formation of a two-phase system during subsequent mixing. Certain glyceridic materials can absorb one percent or so of water but the exact quantity will vary. At the other extreme, the water cannot be present in sufficient degree to cause the flour to gelatinize during later treatment. This value also can vary so that the delineation of an exact range is difficult. However, the determination of the limiting conditions is an easy matter to one skilled in the art. In general, 5–15% water by weight of the flour, as received from the miller, will be found suitable for present purposes. Within this range 8–12% is preferred and optimum performance has been achieved with a water content of about 10%. Flour as received from the miller ordinarily contains about 10–16% moisture absorbed from the atmosphere or provided by the wheat. This natural moisture content is not believed to play any significant role in the present invention. In any event, the water referred to above is added as liquid to the glyceridic material and is distinct from the natural moisture content of the flour.

The amount of glyceridic material necessary to serve as the suspension medium or carrier for the flour may range as low as 25% of the total weight of the flour and glyceridic material. Much below this level, the quantity of flour present exceeds the carrying or suspending abilities of the material, resulting in a mixture that is too viscous for easy handling or efficient heat transfer. In other words, a ratio of 3:1 of flour to glyceridic material is approximately the maximum amount of flour that can be properly mixed with the fluid material to produce a stirrable suspension. A mixture at this ratio has a thick consistency comparable to a heavy frosting or batter. If a normally solid glyceridic material is employed at this ratio, the product after cooling to below the solidification point of the material will have the form of a heavy, pulverulent solid somewhat resembling wet sawdust or ground coconut. If it is desired to obtain a mixture that can be pumped or poured at temperatures below the starch degradation point, the proportion of flour should not exceed twice that of the glyceridic material. At or below this ratio, the mixture is sufficiently fluid to lend itself to pumping in equipment conventionally used for handling viscous liquids. As the amount of flour is reduced, the process for most purposes becomes economically less attractive and there will seldom be found any reason for reducing the ratio to below about 1:2. In general, the minimum amount of flour is selected with a view to the ultimate use of the treated mixture. There are few, if any, culinary products wherein the presence of twice as much shortening as flour is contemplated. Consequently, if the amount of glyceridic material serving as the vehicle exceeds that actually required in the ultimate product, the excess fat, after sterilization, represents mere surplusage which must be separated at some point before the mixture is actually put to use. A preferred range of ratios is about 1.5:1–1:1.5 by weight flour/glyceridic material.

In order that the liquid water be brought into the desired intimacy of contact with the flour, it must be dispersed more or less homogeneously throughout the glyceridic material and remain so a sufficient period of time for the steps of the invention to be performed and where the term "substantially stable, generally uniform dispersion" appears herein, it should be given an interpretation consistent with this statement. In the case of most, if not all, triglycerides, this requires the presence of an emulsifying agent and the imposition of vigorous mixing, preferably by means of high shear mixers, homogenizers or the like. The partial glycerides mentioned above are effective emulsifying agents and if the glyceridic material already contains one or a mixture of these partial glycerides, as do many commercial emulsified shortenings, then no additional emulsifier is necessary. Obviously, the same is true where the glyceridic material is composed wholly of partial glycerides. Alternatively, the partial glyceride may be added to the triglyceride. Examples of partial glycerides include mono- and di-glycerides of higher fatty acids, such as monostearin, monopalmitin, mono-olein and dipalmitin, and mixtures thereof. They can be produced in situ by superglycerination of the triglyceride or prepared separately and added to the triglyceride. In lieu of a partial glyceride, any other emulsifying agent having good dispersing properties can be used. Examples of other edible agents adapted for this purpose include the partial fatty acid esters of glycols, such as propylene glycol-monostearate or monobehenate; higher fatty acid esters of sugars, such as the partial palmitic and oleic acid esters of sucrose; and phosphoric or sulfuric acid esters, such as dodecyl glyceryl ether sulfate and monostearin phosphate. Other valuable emulsifying agents are the partial esters of a hydroxycarboxylic acid, such as lactic, citric, or tartaric acid, with a polyhydric compound, for example, glyceryl lactopalmitate, and the polyoxyethylene ethers of fatty esters of a polyhydric alcohol, such as polyoxyethylene ether of sorbitan monostearate or distearate. In some cases, fatty acids either in the form of free acids or as the ester of a hydroxycarboxylic acid, e.g. stearyl-2-lactylate, will be serviceable. The amount of emulsifying agent will in most cases be selected in accordance with that necessary to achieve a good dispersion of adequate stability; this may vary in accordance with the particular agent and is best determined by means of experimentation. As little as 1–2% of some particularly efficient agents will be adequate while, for others, as much as 15% or 20% will be required. In selecting the amount for edible products, one should not lose sight of the tolerance limits generally accepted in the art for many of the above identified agents, taking into consideration the amount of emulsifying agent remaining in the recovered product as well as the amount of the latter to be employed in the ultimate food article. For sake of simplicity and convenience, since many of the materials identified above are most readily available as emulsified shortenings, the amount of emulsifying agent is considered as forming a part of the glyceridic material in calculating the ratio of flour to glyceridic material.

It has been found that certain existing emulsified shortenings are adapted for the dispersion of the liquid water therein with somewhat milder mixing than is ordinarily required for other shortenings or mixtures of triglycerides and emulsifying agents. These shortenings are pourable suspensions of solid fats in liquid oil containing an emulsifying agent and are characterized by unusual miscibility with limited amounts of water. An example of such a shortening is one prepared in accordance with U.S.P. 2,815,286 and consisting essentially of a stable, pourable suspension in a liquid soy bean oil hydrogenated to an iodine value of about 110 of about 1.4% monoglyceride, 1.4% diglyceride, and 4.2% triglyceride derived from substantially completely hydrogenated soy bean oil. By virtue of the peculiar nature of these suspensions, the shortening, water and flour can be blended simultaneously even with low shear mixing equipment. For example, a Sunbeam household mixer operated at high speed, e.g., about 750 r.p.m., for several minutes is entirely adequate on a laboratory scale. Any comparable shortening having the same characteristics can be employed in this manner.

The process of the invention can be practiced on a batch, semi-continuous or continuous basis. In the first case, the only equipment needed is a sealed mixing vessel equipped with a high shear agitator and means for supplying a controlled amount of heat to the contents thereof, such as a jacketed autoclave or the like having a turbine-type stirrer or equivalent. The glyceridic material is introduced into the vessel and if not already fluid is heated to its melting point. Then the water is introduced together with the emulsifying agent, if not already present in the glyceridic material, and the stirrer is rotated at high speeds until a substantially stable, generally uniform dispersion is achieved. The medium is now ready to receive the flour which is introduced with agitation until a more or less uniform suspension results. Continuous high speed agitation of a given batch may be disadvantageous, increasing the risk of gelatinization. Steam or hot water is now supplied to the autoclave jacket until its contents have reached a temperature within the sterilization range, during which time the stirrer is operated at a speed sufficient for uniform temperature change. Application of the heat is continued for a time necessary to produce sterilization at the selected temperature, after which the contents are allowed to cool under natural or forced conditions until the temperature thereof has been reduced to at least below the starch degradation temperature. If the proportions of ingredients have been so selected as to give a pumpable mixture, the treated mixture can be removed from the autoclave through a line provided for that purpose and pumped to the point of use or storage, as the case may be. If the glyceridic material is naturally solid, the cooling temperature may be maintained above its melting point, e.g. normally about 100–130° F., to facilitate pumping. Alternatively, portions of the product can be removed through the top of the autoclave and transferred under aseptic conditions to the point of use or storage.

An understanding of how the invention might be processed continuously or semi-continuously may be most easily conveyed in conjunction with the annexed flow sheet illustrating one embodiment of a system adapted for this type of operation. In accordance with the embodiment of the flow sheet, the glyceridic material and water are introduced into a mixer 10 equipped with a suitable stirrer or agitator 12 and having a jet 14 through which hot water or steam may be passed. In the event excess glyceridic material is recovered from a later stage of the process, the glyceridic material may be introduced in two streams, that recycled from the recovery point and that necessary to make up the total quantity to the desired level for a pumpable mixture. If the glyceridic material is not naturally liquid, heat is supplied to the mixer until the material is melted. Agitation is initiated and continued until a substantially stable, generally uniform water-in-oil dispersion has been obtained. A valve 16 in the discharge line from the bottom of mixer 10 is now opened and a pump 20 in line 18 is started to deliver the dispersion to a second mixer 22 likewise equipped with a stirrer 24 and a heating jacket 26.

The flour, in the condition as received from the miller or after storage in the usual way, is added to the dispersion in mixer 22, the stirrer 24 being agitated to suspend the flour generally uniformly throughout the dispersion. Hot water or steam is supplied to the jacket of the mixer 22 as is necessary to keep the dispersion in fluid condition. The suspension of flour in the dispersion is passed out through the bottom of the mixer by a discharge line 28 equipped with a valve 30 and is advanced by pump 32 to a high temperature heater 34 wherein the suspension is heated to sterilization temperature. Preferably, heater 34 is a scraped wall heat exchanger as such devices are capable of extremely efficient heat transfer with viscous materials. From heater 34, the hot mixture moves into a hold tube 36, the length of which is selected to provide the proper duration of heating required for good sterilization. Hold tube 36 may be jacketed for maintaining an essentially constant temperature throughout the length thereof. Hold tube 36 discharges into a cooler 38 which, again, is preferably a scraped wall heat exchanger, giving very rapid or flash cooling of the mixture. The temperature of the cooler 38 at least slightly exceeds the solidification temperature of any solid glyceridic material employed so that the mixture will move readily therethrough and into a discharge line 40. Sanitary heat exchangers especially suitable for processing foods are available and are recommended.

If the proportions of the glyceridic material and flour have been selected with a view to the needs of the ultimate product in which the treated mixture is to be used, no further treatment is necessary and line 40 may discharge the mixture directly to the point of use. For many purposes, however, the proportion of glyceridic material present in the mixture after cooling will exceed that desired for purposes of the formulation of the ultimate food article, so that a reduction in glyceridic material content of the treated mixture must be effected before use. To this end, measures may be taken in line 40 to break the now-cooled dispersion. Those familiar with emulsion technology will be aware of the various ways of which water-in-oil dispersions can be broken. One convenient technique, which has been selected for illustration purposes in the flow sheet, is to introduce sufficient sterile water to disturb the equilibrium and break the dispersion, but other techniques could be substituted without difficulty. Once the dispersion is broken, the mixture is delivered via pump 42 to a centrifuge 44 having a heating jacket 46. Here, excess gylceridic material is separated, leaving a mixture of flour, water and a minor proportion of glyceridic material. The separated material can, as already mentioned, be recycled for introduction into the initial mixer 10. Except by extreme and uneconomical means, the mixture discharged from the centrifuge is not further separable into its individual components since the small proportion of glyceridic material remaining after centrifuging is absorbed on, or otherwise closely bound to, the flour. Discharge line 48 can, of course, be arranged to feed the mixture into suitable mixing equipment (not shown) for the formulation of the ultimate product, the additional ingredients employed therein being added, preferably in sterile condition, as is necessary according to the product recipe.

One important advantage of the invention is the apparent absence of criticality in the sterilization conditions, as these conditions can vary rather widely subject only to the fundamental conditions that microbiological life might be at least essentially devitalized, on the one hand, and that the mixture is not significantly cooked, on the other. In general, a temperature of at least about 250° F. is necessary to destroy spore-forming as well as non-sporeforming organisms while temperatures above about 300° F. are better avoided. The duration of exposure to the temperature in this range may vary, for example, from about 5 minutes to as much as 60 minutes, the longer times being ordinarily applied in conjunction with the lower temperatures and vice versa. If the nature of the food article in which the treated mixture is to be incorporated and of the conditions under which the article is to be packaged and distributed are such that non-sporeforming organisms represent the principal source of difficulty, as is more fully explained in the application of Lawrence and Liepa mentioned above, then the treatment temperature can be reduced to about 200–250° F. and the time of exposure to such a temperature reduced to about 1–60 seconds. It will, accordingly, be understood that the present invention is concerned essentially with a particular manipulative procedure for exposing flour to a combination of time and temperature sufficient to destroy some or all of the microbiological contamination thereof rather than the precise limits of these conditions themselves. Such limits are described more completely in the related applications of Japikse and Lawrence, and Lawrence and Liepa already identified.

Adaptation of the concept of the present invention to actual working conditions may be further explained by means of the following examples which are provided by way of illustration only. Unless otherwise indicated, all parts are by weight.

*Example I*

A mixture of 7.04 parts of triglyceride fat (a mixture of partially hydrogenated soybean oils) and 0.96 parts of a lactylated emulsifier are placed in a water-jacketed bowl of a Model C 100 Hobart double motion bench mixer having a perforated paddle agitator. Such an emulsifier is produced by direct esterification of glycerine with a mixture of fatty acid and lactic acid. Alternatively, it can be obtained by reacting lactic acid with superglycerinated soybean hoil hydrogenated to an iodine value of 8 and consisting of about 40% mono-, 40% di- and 20% triglyceride. The mixture is melted by running water at 130° F. through the bowl jacket and one part of water added ot the bowl. The mixer is now started on setting 3 (high speed) and operated for approximately 30 minutes, at which point a good stable dispersion is obtained. 10 parts of flour is then introduced and mixed at the same setting for about 10 minutes until uniformly suspended in the dispersion. The suspension of flour in the water-in-fat dispersion is removed from the mixer and placed as a thin layer in an aluminum 9 inch square cake pan, covered with aluminum foil and heated in an autoclave for one hour at 250° F.

At the end of this time, the suspension is cooled to about 130° F. and 8.5 parts of sterile water are mixed in, which is sufficient to break the emulsion. The broken emulsion is transferred in a sterile room from the mixing bowl to a centrifuge maintained at 130° F., the centrifuge being effective to separate 5.5 parts of the fat-emulsifier mixture. The water phase discharged from the centrifuge is in the form of a thick slurry or gravy-like material consisting of 2.2 parts fat, 0.3 part emulsifier, 8.5 parts water and 10 parts flour. Samples of this mixture are tested for sterility by the procedure described in the bulletin "Control of Canned Food Sterility" obtained from the National Canners Association, Washington, D.C. This procedure is a gross test for sterility and, in general, involves adding samples of the treated mixture under aseptic conditions to test tubes containing a sterile bacteriological medium, i.e., stratified tryptone broth, and incubating the tubes for about two weeks at 37 and 55° C. At the end of this time, the tubes are examined for microbial growth as evidenced by increase in turbidity, change in odor or splitting of the agar. If none of these conditions are present, reasonable certainty exists that the sample is sterile. This is the case as to the samples of the mixture of this example. In addition, they are subjected to recognized tests for flat sour bacteria, acid-tolerant types and sulfide spoilage organisms. In all cases, the results evidence sterility.

Another portion of the treated mixture is combined with sterile water, egg solids, sucrose, salt, milk solids, flavoring and the like in proportions according to a standard laboratory recipe for making yellow cakes. The resultant batter can be retained in a sealed container at room temperature for several months without evidencing any bacterial or mold growth. The batter, when poured into a greased pan and baked at the usual cake-baking temperature of about 350° F., produces a cake of acceptable quality and texture.

*Example II*

Ten parts of an emulsified liquid shortening which is the stable pourable suspension of mono-, di- and triglycerides in liquid oil mentioned in the body of the specification, are blended simultaneously with 3 parts of water and 10 parts of flour with a Sunbeam household mixer operated at 750 r.p.m. for about 20 minutes to insure a homogenous condition. The blend is then heated for 60 minutes at 250° F. in a sealed steam jacketed autoclave, after which the autoclave is cooled by circulating tap water through its jacket until its contents are at room temperature. When discharged aseptically and cooled, the finished mixture is a rather heavy, sawdust-like, pulverulent solid and is ready for use as such. Sterility tests carried out as in the preceding example indicate that the mixture has been rendered sterile.

The process of the invention obviously finds greatest application in the food field and has been so described. For this purpose, the glyceridic material and the emulsifying agent will, of course, be of a quality and/or grade suitable for human consumption, as has already been indicated. In the event the product were to be employed for some other purpose, however, this restriction would not apply. Moreover, it will be apparent to one skilled in the art that the concept of the invention could be adapted to the sterilization of heat-sensitive pulverulent solids other than flour in any instance where a combination of that solid and a fatty or oleaginous material might be useful.

Having thus described the invention, that which is claimed is:

1. A method of treating flour which comprises the steps of forming in the presence of an effective amount of an emulsifying agent a substantially stable, generally uniform dispersion in a glyceridic material of water in the amount of about 8–12% by weight of the flour to be treated, admixing to said dispersion the flour to be treated in the ratio by weight of flour to said glyceridic material of about 3:1–1:2, heating the mixture thus produced at a temperature and for a time sufficient to destroy at least the non-sporeforming microorganisms present therein, and thereafer cooling the mixture to a temperature at least below the degradation point of starch.

2. The method of claim 1 including the additional steps of breaking said cooled dispersion to form an excess glyceridic material phase and a mixed phase of water, flour and inseparable glyceridic material, and recovering said mixed phase.

3. The method of claim 1 wherein said glyceridic material is a fatty triglyceride containing an emulsifying agent.

4. The method of claim 3 wherein said emulsifying agent is present in an amount of about 1–20% of the total weight of fatty triglyceride and emulsifying agent.

5. The method of claim 1 wherein said mixture is heated at a temperature within the range of about 250–300° F. for a time of about 5–60 minutes, and sufficient to destroy the spore-forming microorganisms present therein, said time varying generally inversely with said temperature.

6. The method of claim 1 wherein said mixture is heated to a temperature of about 200–250° F. for a time of about 1–60 seconds and sufficient to destroy the said non-sporeforming bacteria, said time varying generally inversely with said temperature.

7. The method of claim 1 wherein the amount of said water is about 10% and the ratio of flour to glyceridic material is about 1.5:1–1:1.5.

8. A method of treating flour which comprises the steps of forming in the presence of an effective amount of an emulsifying agent a generally uniform suspension of flour in a glyceridic material having water generally uniformly dispersed therethrough in the amount of about 8–12% by weight of said flour, the weight of flour in said suspension being in the ratio of about 3:1–1:2 to the weight of glyceridic material; heating the suspension to a temperature and for a time sufficient to destroy at least the non-sporeforming microorganisms present therein, and thereafter cooling the suspension to a temperature below the degradation point of starch.

9. A method of treating flour which comprises the steps of forming in the presence of an effective amount of an emulsifying agent a generally uniform suspension of flour in a glyceridic material having dispersed therein free water in an amount sufficient to produce a two-phase system but insufficient to result in gelatinization of the flour during treatment, the weight of flour in said suspension being in the ratio of about 3:1–1:2 to the weight of glyceridic material; heating the suspension to a temperature and for a time sufficient to destroy at least the non-sporeforming microorganisms present therein, and thereafter cooling the suspension to a temperature below the degradation point of starch.

10. A method of treating flour which comprises the steps of forming in the presence of an effective amount of an emulsifying agent a generally uniform suspension of flour in a glyceridic material having water generally uniformly dispersed therethrough in the amount of about 5–15% by weight of said flour, the weight of flour in said suspension being in the ratio of about 3:1–1:2 to the weight of glyceridic material; heating the suspension to a temperature and for a time sufficient to destroy at least the non-sporeforming microorganisms present therein, and thereafter cooling the suspension to a temperature below the degradation point of starch.

References Cited in the file of this patent

FOREIGN PATENTS 21,478   Great Britain _____ 1910